March 19, 1963 R. T. BERGMAN 3,081,545
DRAFTING INSTRUMENT
Filed Feb. 23, 1960
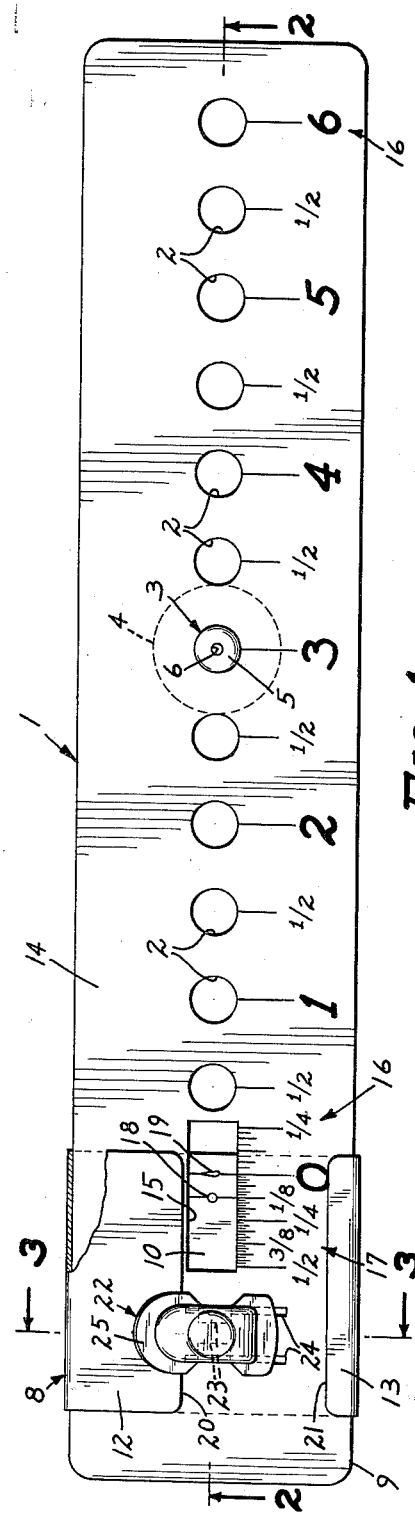
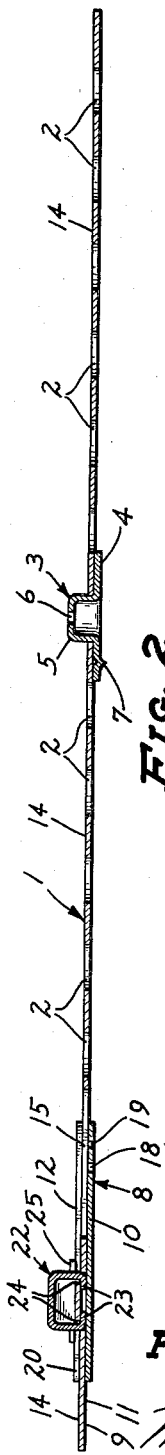
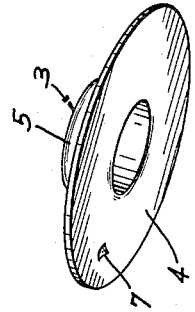
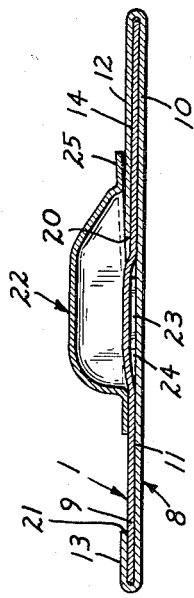
INVENTOR.
ROBERT T. BERGMAN
BY
Merchant & Merchant
ATTORNEYS United States Patent Office 3,081,545
Patented Mar. 19, 1963

3,081,545
DRAFTING INSTRUMENT
Robert T. Bergman, 3104 Clinton Ave.,
Minneapolis, Minn.
Filed Feb. 23, 1960, Ser. No. 10,219
1 Claim. (Cl. 33—27)

This invention relates generally to drafting instruments, and more particularly it relates to a drafting instrument of the compass type for use in alternatively drawing or cutting circular patterns.

An important object of this invention is the provision of a drafting instrument which is formed from a ruler that is provided with a graduated series of longitudinally spaced apertures adapted to selectively receive a stud-button which cooperates with a guide plate for providing means by which circles or parts of circles of any given radius may be laid off without the use of a pair of compasses.

Another object of this invention is the provision of a drafting instrument in which the guide plate is adapted to receive either a marking instrument or a cutting instrument so as to enable the drawing or cutting of circular patterns.

A further object of this invention is the provision of a drafting instrument in which the diameter of the circles to be drawn thereby may be easily and quickly changed merely by shifting the position of the stud-button to an alternative one of the longitudinally spaced apertures.

A still further object of this invention is the provision of a drafting instrument which is provided with means for quickly and accurately centering the instrument over a point about which it is desired to describe a circle or arc.

Another object of this invention is the provision of a drafting instrument which is provided with means for quickly and accurately adjusting and setting the length of the radius of a circle to be described thereby.

Still further objects of this invention reside in the provision of a drafting instrument which is relatively simple in construction, economical to manufacture, efficient in its operation, and strong and durable for its intended use.

The above and still further objects of this invention will become apparent from the following detailed specification, appended claim and attached drawings.

Referring to the drawings wherein like reference characters indicate like parts or elements throughout the several views:

FIG. 1 is an enlarged view in top plan of my novel drafting instrument;

FIG. 2 is a view in longitudinal section thereof taken on the line 2—2 of FIG. 1;

FIG. 3 is a greatly enlarged sectional view thereof taken on the line 3—3 of FIG. 1; and FIG. 4 is a greatly enlarged view in perspective of the stud-button used in connection with my invention.

Referring with greater particularity to the drawings, the reference numeral 1 represents generally an elongated ruler which may be fabricated from any thin suitable material such as metal, wood or plastic. The ruler 1 defines a graduated series of longitudinally spaced circular apertures 2 which are preferably, and as shown, disposed in general alignment about the approximate longitudinal center line of the ruler 1. A centering stud-button, represented generally by the reference numeral 3, is selectively and removably journalled within one of the apertures 2, as shown particularly in FIG. 1. The stud-button 3 comprises a flat annular flange portion 4 and an annular integrally formed upstanding button portion 5. When the stud-button 3 is operatively positioned within one of the apertures 2 the flange portion 4 thereof is disposed in underlying relationship to said ruler, and the button portion 5 thereof is journalled within the apertures 2 so as to allow rotation of the ruler 1 about the stud-button 3. The button portion 5 of the stud-button 3 also defines a centrally disposed sight aperture 6 therein whereby the stud-button 3 may be easily, quickly and accurately centered over a point, not shown, about which it is desired to describe an arc or circle. The flange portion 4 defines a small depending projection 7 which engages the drafting paper, not shown, or other underlying support of the ruler 1 so as to prevent the stud-button 3 from slipping on the paper when it is operatively engaged.

A longitudinally adjustable guide plate, represented generally by the reference numeral 8, is slidably secured to one end 9 of said ruler 1. The guide plate 8 comprises a rear portion 10 disposed against the back face 11 of the ruler 1 and integrally formed transversely spaced front flange portions 12 and 13 respectively disposed against the front face 14 of the ruler 1. The ruler defines a longitudinal slot 15 disposed intermediate the end 9 of the ruler 1 and the first of the apertures 2. The apertures 2 are preferably, and as shown, disposed on one half inch centers, and the ruler 1 therefore preferably provides a scale, represented generally by the reference numeral 16, which begins at the slot 15 and progresses therefrom as shown particularly in FIG. 1. The ruler 1 adjacent the slot 15 is also provided with an auxiliary scale, represented generally by the reference numeral 17, of a graduated length equal to the spacing between the apertures 2. It should be noted that the spacing between the apertures 2 could be of any convenient dimension, however the spacing of one half inch was chosen because it permits the increasing or decreasing of the diameter of the circles drawn by the drafting instrument by one inch merely by moving the stud-button 3 into the next aperture 2.

The guide plate 8 is provided with a marking aperture 18 and a closely spaced cutting aperture 19 both of which are disposed adjacent the slot 15 so as to be readily accessible from the front face 14 of the ruler 1. The marking aperture 18 is formed so as to receive marking instruments such as a pencil or stylus, not shown, and the cutting aperture 19 is formed so as to receive a cutting blade, not shown.

The flange portions 12, 13 of the guide plate 8 define corresponding opposed transversely spaced edges 20 and 21 respectively which are disposed on opposite sides of the slot 15. Associated with said guide plate 8 is a lock button, represented generally by the reference numeral 22, which is slidably mounted on said ruler 1 by a pair of side tabs 23 received within longitudinally spaced transversely extending tracking slots 24. The lock button 22 is thereby mounted for transverse sliding movements from an operative locked position wherein the upper edge 25 of said lock button 22 engages the edge 20 of the guide plate 8 so as to urge the same against the front face 14 of the ruler 1 to an inoperative non-engaging unlocked position wherein said guide plate 8 is free to slide longitudinally with respect to the ruler 1. From the above description, it should be apparent that the radius of a circle as described by this instrument is first set to the nearest one half inch by selectively positioning the stud-button 3 in the appropriate one of the apertures 2 and thereafter setting the remaining fractional distance, if any, of the radius by sliding the marking aperture 18 or the cutting aperture 19 of the guide plate 8 along the auxiliary scale 17, after which the guide plate 8 is locked in place by means of the lock button 22.

Having specifically described my invention, the following statements are offered for the purpose of teaching the operative simplicity of my invention. After placing a marking or cutting instrument, not shown, in either of the apertures 18, 19, it should be obvious that the same is used in cooperation with the stud-button 3 for describing circles thereabout upon rotation of the ruler 1 about the axis of a stud-button 3. After selecting the radius of the circles or arc to be described, and setting the same on the drafting instrument by moving the stud-button 3 and the guide plate 8, as above described, the stud-button 3 is centered over the center-point, not shown, of the circle either by sighting through the sight aperture 6 of the stud-button 3 or by placing a stylus therethrough. Thereafter the stud-button 3 is engaged by the finger of the user so as to limit all movement of the ruler 1 upon its underlying drafting paper, not shown, or other support except circumferential movement thereof about the axis of said stud-button 3, and the ruler 1 is rotated circumferentially about the stud-button.

This invention has been thoroughly tested and found to be completely satisfactory for the accomplishment of the above objects; and while I have shown a preferred embodiment thereof, I wish it to be specifically understood that the same may be modified without departure from the scope and spirit of the appended claim.

What I claim is:

A drafting instrument comprising a ruler provided with a graduated series of longitudinally spaced apertures having associated scale indicia defined adjacent said apertures on the front face of said ruler, a centering stud-button selectively and removably journalled within one of the apertures, said stud-button being engageable by the finger of the user so as to limit all movements of said ruler upon its underlying support except circumferential movement thereof about the axis of said stud-button, said ruler also defining at one of its ends a longitudinal slot and an auxiliary scale disposed adjacent said slot and being of a graduated length equal to the spacing between said apertures, a longitudinally adjustable guide plate slidably secured to said one end of said ruler adjacent said slot, said guide plate being generally C-shaped and comprising a back portion slightly disposed against the back of said ruler and generally co-planar front portions disposed against the front face of said ruler, said front portions of said guide plates being formed with edges spaced transversely of said ruler and extending longitudinally with respect thereto and also being disposed on opposite sides of said slot in said ruler, said guide plate being formed to receive alternately a marking or cutting point and cooperating with said stud-button for describing circles thereabout upon rotation of said ruler about the axis of said stud-button, and said drafting instrument further comprising locking means carried by said ruler for releasably locking said guide plate against longitudinal movement thereof with respect to said ruler, said locking means comprising a lock button slidably mounted on said ruler for transverse sliding movements from an operative locked position engaging one edge of said guide plate so as to urge the same against said ruler to an inoperative unlocked position wherein said guide plate is free to slide longitudinally with respect to said ruler.

References Cited in the file of this patent

UNITED STATES PATENTS

| | | |
|---|---|---|
| 487,364 | Chandler | Dec. 6, 1892 |
| 844,157 | Loughborough | Feb. 12, 1907 |
| 1,825,266 | Fischer | Sept. 29, 1931 |
| 2,428,310 | Hendry | Sept. 30, 1947 |
| 2,542,537 | Klemm | Feb. 20, 1951 |
| 2,768,443 | Chiaravalloti | Oct. 30, 1956 |

FOREIGN PATENTS

| | | |
|---|---|---|
| 17,716 | Great Britain | 1910 |